United States Patent [19]

Ardueser et al.

[11] Patent Number: 4,889,047
[45] Date of Patent: Dec. 26, 1989

[54] BALE PUSH BAR

[75] Inventors: William A. Ardueser; Henry D. Anstey, both of Ottumwa, Iowa

[73] Assignee: Deere & Company, Moline, Ill.

[21] Appl. No.: 222,982

[22] Filed: Jul. 18, 1988

Related U.S. Application Data

[62] Division of Ser. No. 75,499, Jul. 20, 1987, Pat. No. 4,779,527.

[51] Int. Cl.⁴ .......................... B30B 5/04; B30B 9/00
[52] U.S. Cl. ............................. 100/87; 100/88; 100/89; 56/341; 414/781; 414/911
[58] Field of Search .............. 100/88, 89, 87; 56/341; 414/24.6, 781, 911

[56] References Cited

U.S. PATENT DOCUMENTS

| | | | |
|---|---|---|---|
| 3,779,208 | 12/1973 | Gay | 414/24.6 |
| 3,938,682 | 2/1976 | Rowe | 414/911 X |
| 3,974,632 | 8/1976 | Van der Lely | 100/88 X |
| 4,084,763 | 4/1978 | Zamboni | 414/911 X |
| 4,089,425 | 5/1978 | Baltz | 414/911 X |
| 4,206,587 | 6/1980 | Freimuth et al. | 100/88 X |
| 4,402,176 | 9/1983 | Arnold et al. | 56/341 |
| 4,428,282 | 1/1984 | Anstey | 100/88 |
| 4,483,247 | 11/1984 | Coeffic | 100/88 |

FOREIGN PATENT DOCUMENTS

| | | | |
|---|---|---|---|
| 110056 | 6/1984 | European Pat. Off. | 56/341 |
| 217715 | 4/1987 | European Pat. Off. | 56/341 |
| 3247661 | 6/1984 | Fed. Rep. of Germany | 56/341 |

Primary Examiner—Philip R. Coe
Assistant Examiner—Stephen F. Gerrity

[57] ABSTRACT

A U-shaped bale push bar straddles a discharge gate of a large round baler with opposite legs of the bar being respectively pivotally connected to a pair of support brackets which are secured to and project rearwardly alongside the discharge gate from upper rear locations of opposite sidewall sections forming a portion of the baler main frame. A pair of chains are coupled between forward locations of the gate and the legs of the push bar and serve as lost-motion connections that cause the push bar to extend and retract respectively in following relationship to opening and closing movements of the gate such that interference between the gate and a discharged bale is avoided. An over center spring assembly acts between the push bar and support brackets to bias the bar toward its retracted position when the gate is closed and to bias the push bar toward its extended position when the gate moves a small amount towards its open position a small amount beyond an intermediate position permitting discharge of a bale. A shock absorber assembly works against the energy of the over center spring assembly to prevent sudden motion of the push bar.

1 Claim, 6 Drawing Sheets

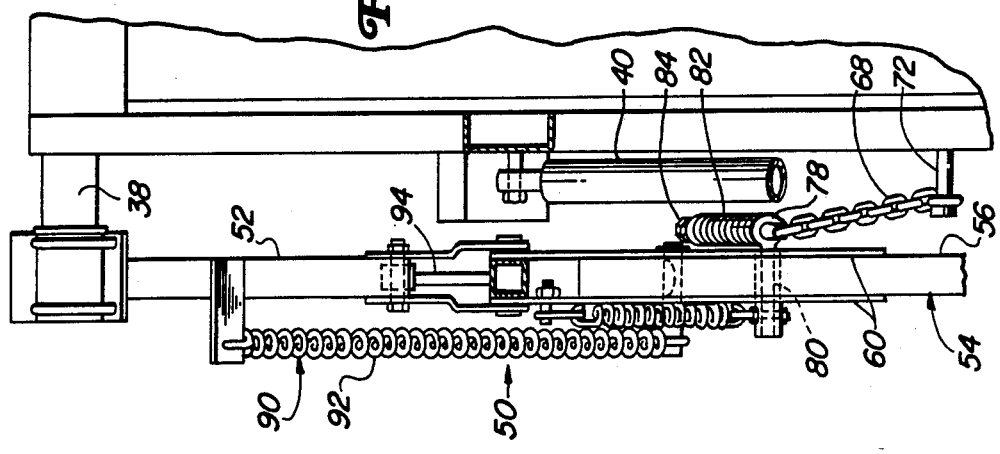
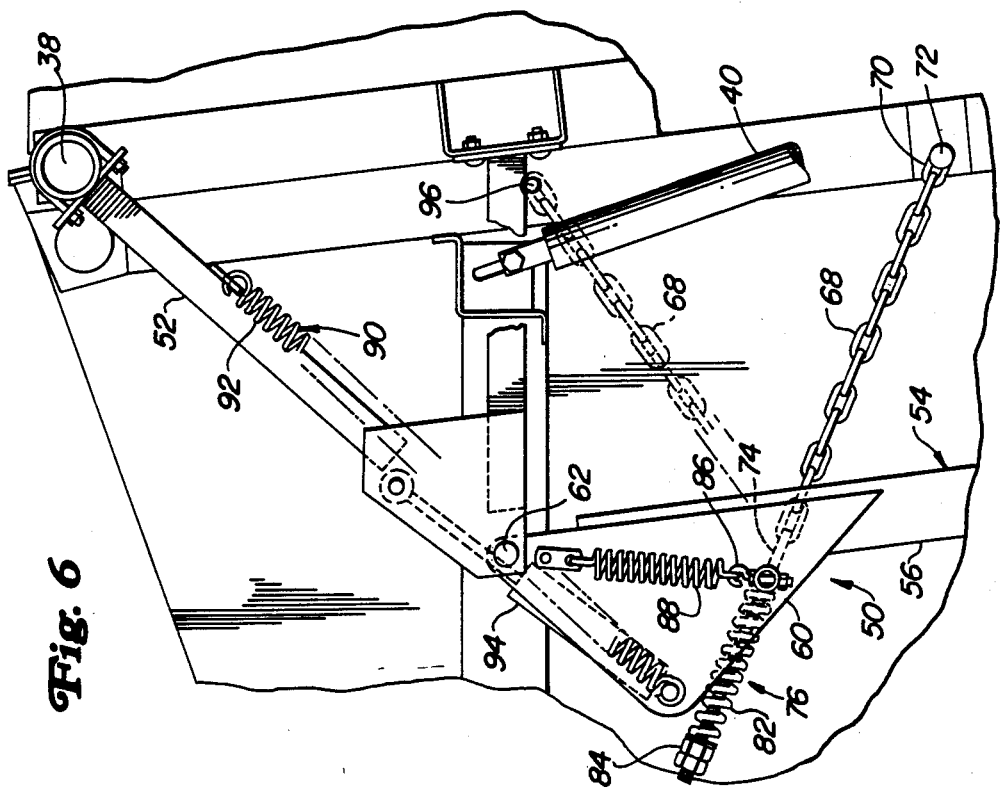

BALE PUSH BAR

This application is a division of application Ser. No. 075,499, filed July 20, 1987 now U.S. Pat. No. 4,779,527.

BACKGROUND OF THE INVENTION

The present invention relates to balers for forming large cylindrical bales and more specifically relates to devices for pushing a discharged bale rearwardly of an opened bale discharge gate and for holding the bale rearwardly of the gate until the latter is returned to its closed position.

U.S. Pat. No. 4,483,247 issued on Nov. 20, 1984 discloses a push bar of the above-described type. Specifically, the patented device includes a bale-forming chamber having opposite ends defined by opposite sidewalls including forward portions forming part of a fixed main baler frame and rearward portions forming opposite sidewalls of a bale discharge gate which is vertically swingably mounted to an upper rear location of the fixed forward sidewall portions. A U-shaped bale push bar includes opposite legs vertically pivotally connected to the fixed forward sidewall portions adjacent the pivotal connection of the discharge gate. A push member joins the legs and is located beneath a lower forward portion of the gate, when the latter is in a closed position. A first pair of extensible and retractable hydraulic actuators are connected between the baler main frame and discharge gate for swinging the latter between a lowered closed position and a raised discharge position. A second pair of extensible and retractable hydraulic actuators are connected between the baler main frame and the push bar for swinging the latter between a retracted position, wherein the push member is beneath a path traced by the discharge gate when the latter moves between its closed and open positions, and an extended position wherein the push member is rearward of the path. The first and second hydraulic actuators are coupled in a hydraulic system including sequencing valving which ensures that the gate is completely open before the push bar moves a bale rearwardly and is completely closed before the push bar moves from its extended to its retracted position.

While the patented structure is effective to permit the discharge of a bale without requiring the baler to be moved in order to avoid interference between a discharged bale and the discharge gate as the latter is closed, it is essential that the sequencing valves of the patented structure be operational and that their settings be correctly established and maintained to ensure that there is no interference between a discharged bale and the discharge gate.

SUMMARY OF THE INVENTION

According to the present invention there is provided a novel push bar assembly having a push bar which operates to prevent interference between a bale discharged from a baler for forming large cylindrical bales and the discharge gate of such a baler as the latter swings between its lowered closed position and raised discharge position.

A broad object of the invention is to provide a push bar which is extended and retracted in proper sequence, relative to the opening and closing of a bale discharge gate, by a mechanical coupling for transferring movement of the gate to the push bar.

A further object of the invention is to provide a mechanical coupling as set forth above which incorporates a lost-motion connection which causes the movement of the push bar to lag that of the discharge gate an amount necessary to avoid interference between the gate and a discharged bale.

Yet another object of the invention is to provide a mechanical coupling, as stated in the preceding object, which includes an over center spring assembly which acts when on one side of its line of center to bias the discharge gate towards its closed position and acts to bias the discharge gate toward its open position when on another side of its line of center.

Still another object of the invention is to provide a mechanical coupling which includes shock absorbing means for cushioning movement of the gate to its open position in the event that the gate is opened without there being a bale located in the bale chamber.

These and other objects, features and advantages of the present invention will become apparent to those skilled in the art from the description which follows and from the drawings.

BRIEF DESCRIPTION OF THE DRAWINGS

FIG. 6 is an enlarged portion of FIG. 2 showing the chain connection between the gate and push bar.

FIG. 7 is a front elevational view of the structure shown in FIG. 6.

DESCRIPTION OF THE PREFERRED EMBODIMENT

Figure 1:
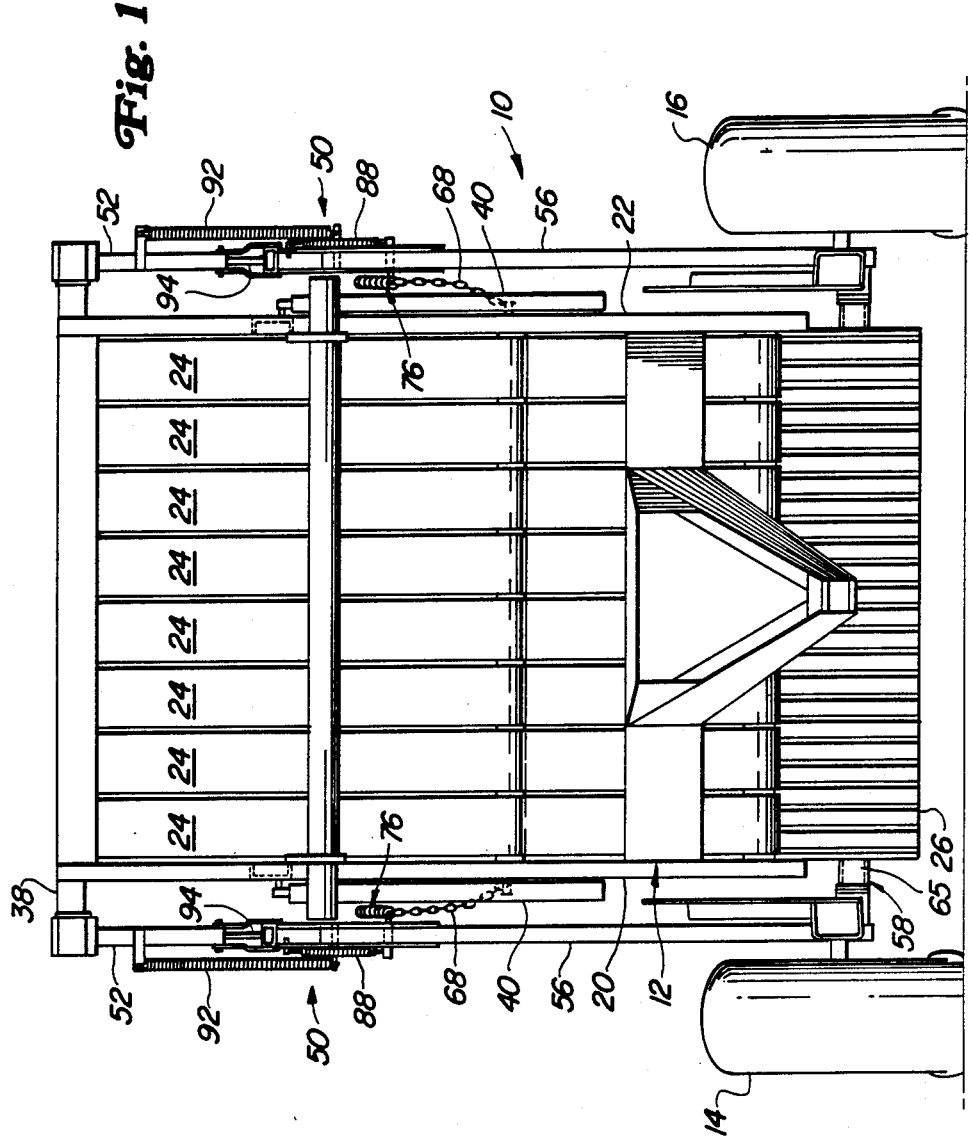
FIG. 1 is a front elevational view of a large round baler equipped with a push bar assembly constructed in accordance with the present invention and showing the discharge gate closed and the push bar in its retracted position.

Referring now to the drawings, there is shown a baler 10 of the type for making large cylindrical bales and commonly called a large round baler. The baler 10 comprises a main frame 12 supported on a pair of ground wheels 14, 16 and including a forwardly projecting draft tongue 18. An expansible bale chamber is defined by opposite sidewalls 20 and 22 and a plurality of side-by-side belts 24 supported on a plurality of belt support and belt tensioning and take-up rolls (not shown) arranged, as disclosed in U.S. Pat. No. 4,428,282 issued on Jan. 30, 1984, for defining an inlet in the bottom of the chamber for receiving crop delivered by a pickup 26 so that it may be rolled by action of the belts 24 into a completed bale 28.

Figure 2:
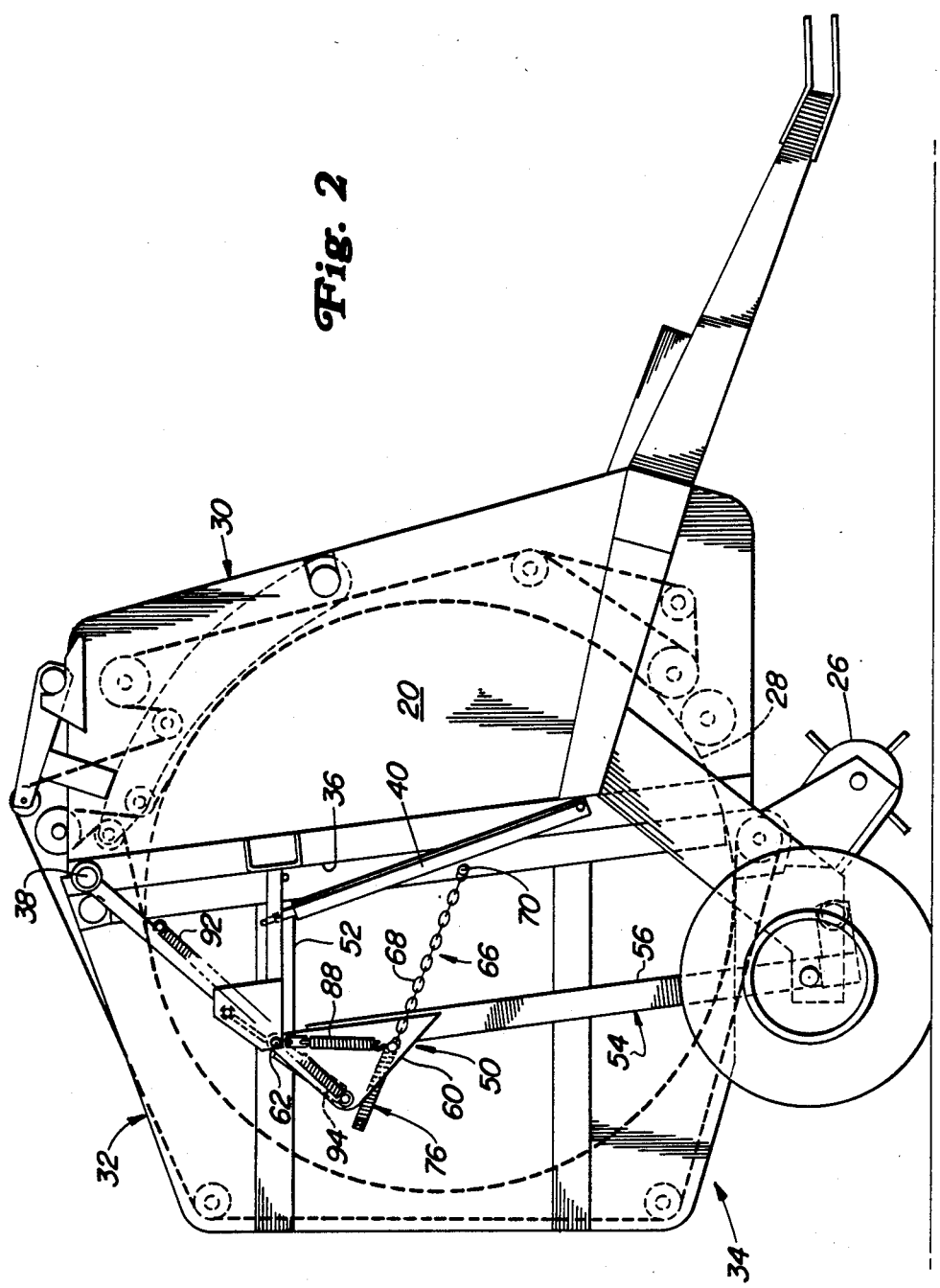
FIG. 2 is a right side elevational view of the baler shown in FIG. 1.
Figure 3:
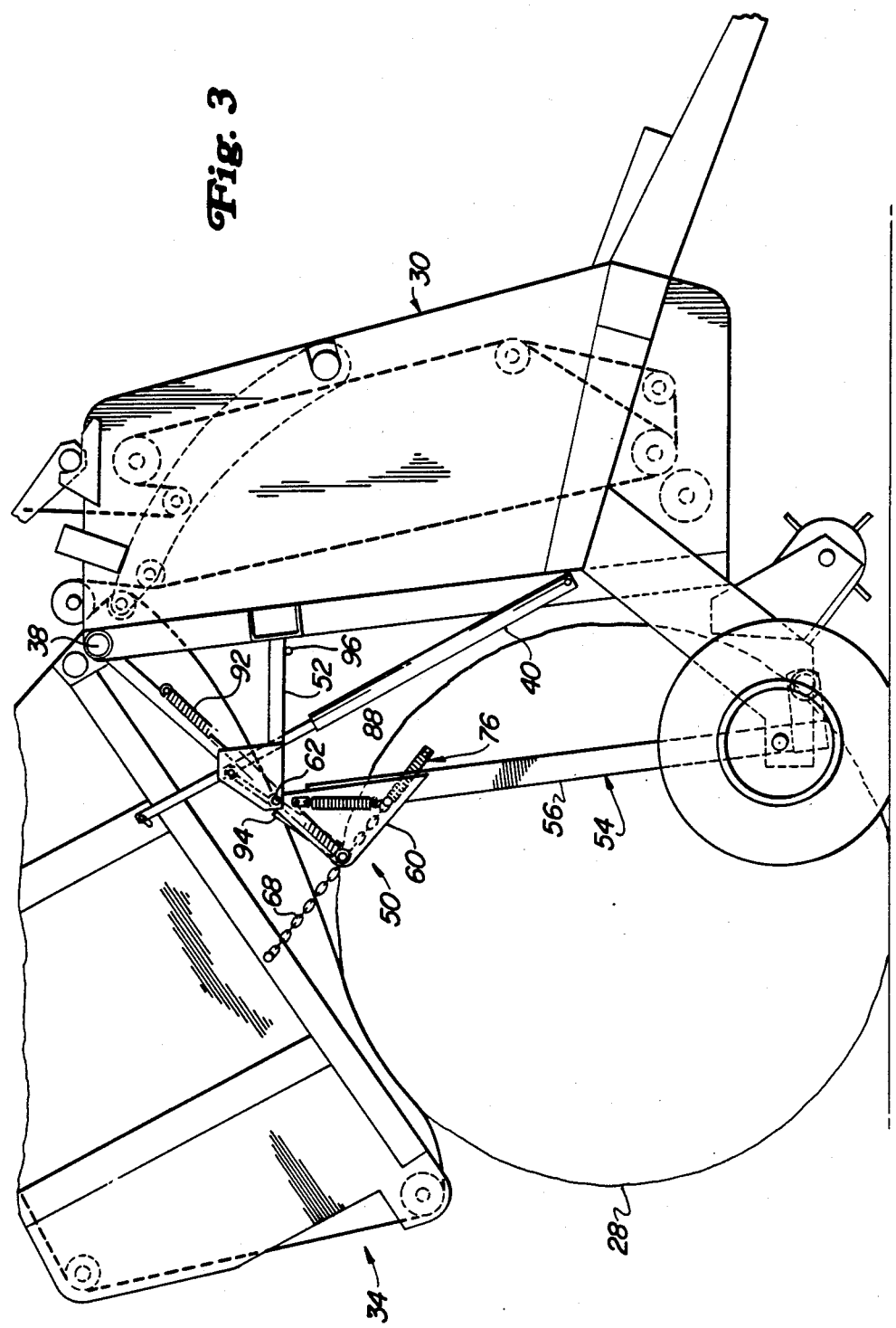
FIG. 3 is a view like FIG. 2 but showing the discharge gate opened far enough to permit a bale to drop from the bale-forming chamber to the ground and showing the slack removed from the lost-motion effecting chain connected between the gate and push bar.
Figure 4:
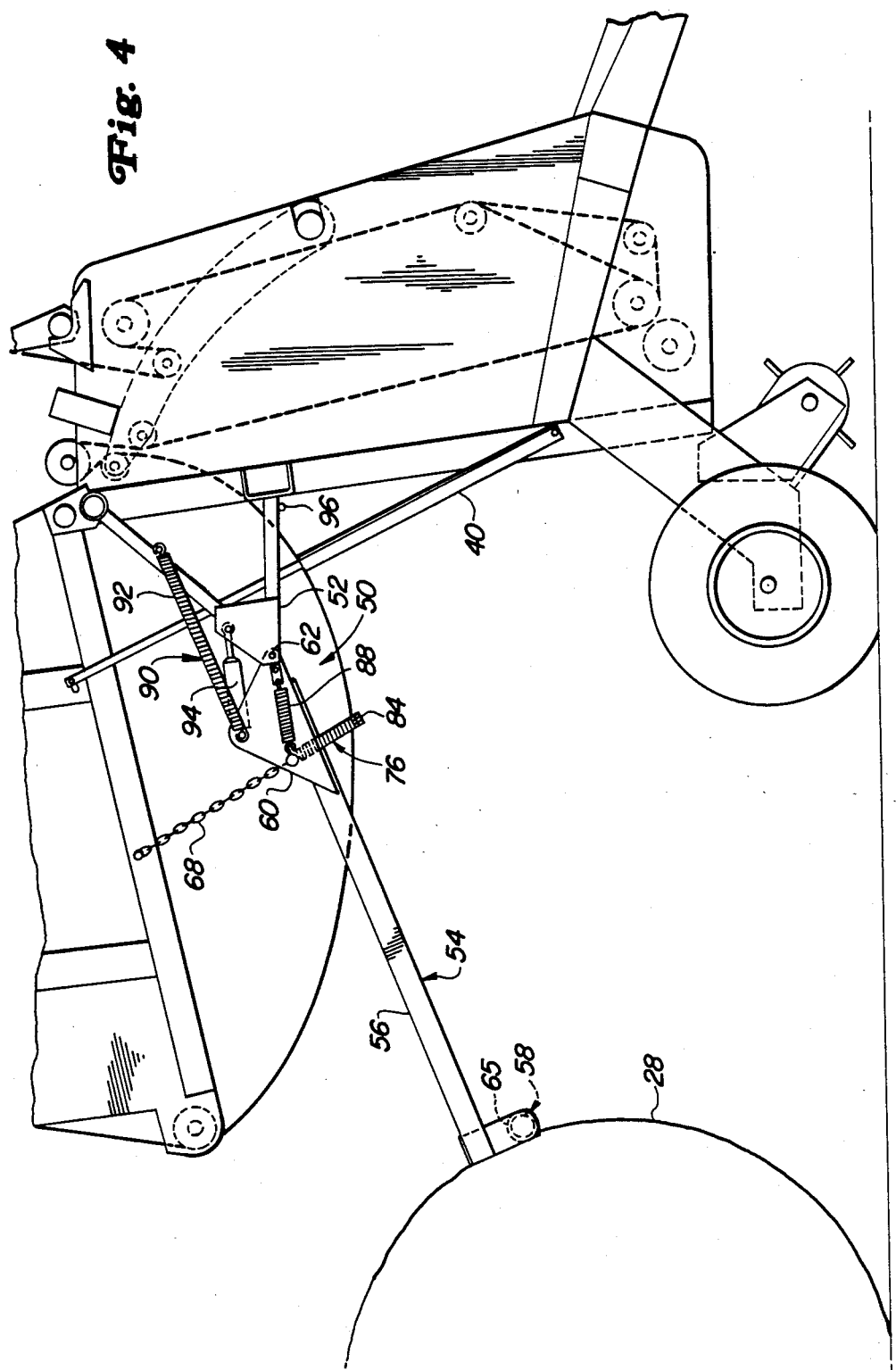
FIG. 4 is a view like FIG. 2 but showing the gate fully open with the push bar fully extended and the shock absorber collapsed and acting as an up-stop for the push bar.
Figure 5:
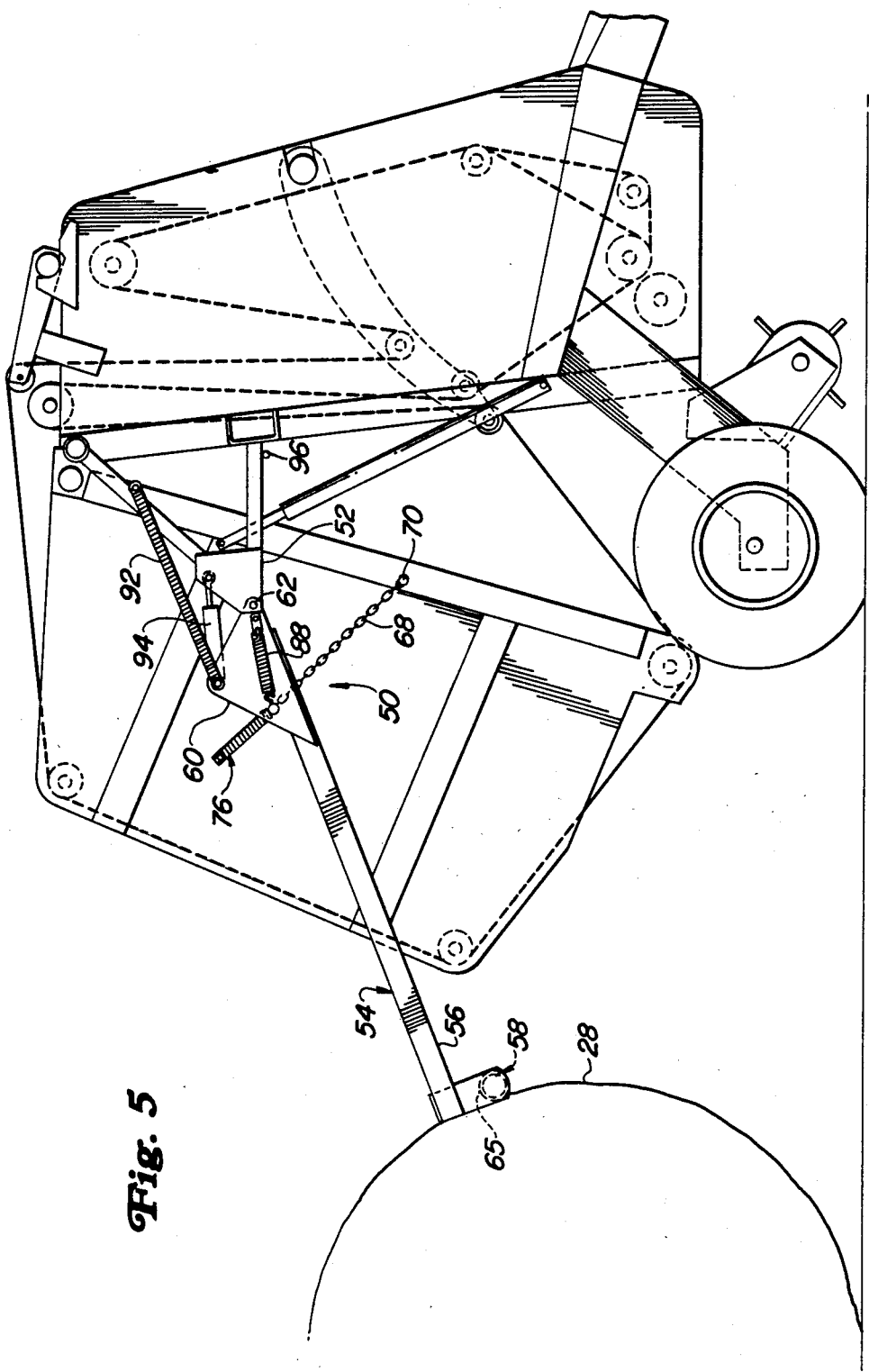
FIG. 5 is a view like FIG. 2 but showing the gate in its closing cycle where the chain connecting the gate and push bar has just become taut whereby further gate movement will pull the push arm toward its retracted position.

The sidewalls 20 and 22 are composed of a front section 30 forming part of the main frame 12 and a rear section 32 forming part of a discharge gate 34, the sections 30 and 32 meeting at a generally vertical transverse plane 36 when the gate 34 is closed, as shown in FIG. 2. The gate 3 is mounted to an upper rear location of the front section 30 by a structure 38 forming a transverse pivot axis about which the gate 34 is rearwardly and upwardly swingable to a raised, fully open position, as shown in FIG. 4. A pair of extensible and retractable hydraulic gate actuators 40 (only one shown) are mounted between the front section 30 and the gate 34 and serves to open and close the latter as desired.

The present invention resides in a bale push bar assembly 50 mounted to the front section 30 of the baler for pushing and holding a discharged bale clear of the gate 34 as the latter is cycled between its closed and open positions. Specifically, the push bar assembly 50 includes a pair of support brackets 52 secured to upper rear locations of the sidewalls of the front section 30 and extending rearwardly alongside the opposite sidewalls of the gate 34. A U-shaped push bar 54 has opposite legs 56 joined at one end by a transverse bale push member 58 and having another end defined by a pair of spaced triangular plates 60 each of which have the rear end of one of the brackets 52 received therebetween and secured thereto by a pivot connection 62. The pivot connections 62 are coaxial and establish a horizontal transverse axis about which the push member 58 is swingable between a retracted or lowered stored position, disposing the push member 58 in a home position beneath the gate 34 when the latter is closed (FIG. 2) and an extended or raised position disposing the push member 58 rearwardly of a path 64 travelled by a lower extremity of the gate as it moves from its closed to its fully open position (FIG. 4). The push member 58 is defined by a cylindrical metal core on which is received a friction reducing roller 65 for reducing the frictional drag imparted to the member by a bale engaged thereby, which results in an easier kick action. Preferably, the roller 65 is made of a plastic tube.

A linkage 66 exhibiting a lost-motion characteristic is provided for establishing a connection between the gate 34 and the push bar 54 whereby opening and closing the gate 34 effects extension and retraction of the push bar 54, with such extension and retraction lagging the gate movement sufficiently to ensure a discharged bale pushed and held by the push bar does not interfere with the gate. The linkage 66 is defined by identical structure located at opposite sides of the baler and only that structure located at the right side of the baler is completely illustrated. Specifically, this structure includes a flexible elongate member in the form of a link chain 68 having its forward end defined by a link 70 respectively received on an outwardly projecting pin 72 fixed to a central forward location of the right sidewall of the gate 34. The rear end of the chain 68 is coupled to one end of a rod 74 forming part of a shock absorber 76. The rod 74 is slidably received in an eye 78 of a transverse eyebolt 80 that is swivelly mounted in the pair of triangular plates 60. A coil compression spring 82 is received on the rod 74 and compressed between an adjustable double nut assembly 84 at one end of the rod and the eye 78. To ensure the proper orientation of the shock absorber 76, a smaller eyebolt 86 extends crosswise through and is secured to an outwardly projecting end of the transverse eyebolt 80. Coupled between the pair of plates 60 and the eye of the eyebolt 86 is a tension spring 88.

An over-center spring assembly 90 is mounted between the pair of plates 60 of each leg of the push bar 54 and the adjacent bracket 52 and serves when on one side of center to bias the push bar towards its retracted position and when on the other side of center to bias the push bar towards its extended position. Specifically, each spring assembly 90 includes a tension spring 92 having its opposite ends connected to one of the brackets 52 and one of the pairs of plates 60 such that, when the gate 34 is closed, the spring is stretched and has its center line passing close to but below the pivot axis established by the connections 62 of the push bar 54 to the brackets 52. Thus, the spring 92 then acts to bias the push bar 54 to its retracted position. It will be appreciated that only a small upward displacement of the push bar 54 is needed for moving the springs 92 over center such that they bias the push bar 54 toward its extended position. However, during opening of the gate 34 no displacement of the push bar 54 will occur until the gate has swung far enough to tighten the chains 68, it being noted that upon initial movement of the gate 34 the chains 68 will slacken and be ineffective in transferring gate movement to the push bar.

Normally the gate 34 will be opened only to discharge a bale in which case the action of the springs 92, when moved over center to bias the push bar 54 to its extended position, will work against the resistance of the discharged bale. However, provided for cushioning the action of the springs 92 in the event that the gate 34 is opened when no bale is present to be discharged, or when upward movement of the push bar 54 is not being restrained by the chains 68 is a pair of shock absorbers 94 which may be of the gas or oil cylinder type. Each shock absorber 94 has one end coupled to one of the pairs of triangular plates 60 and another end coupled to an adjacent one of the brackets 52. The lines of center of the shock absorbers 94 are located so as to be just above the connections 62 establishing the pivot axis of the push bar 54 when the latter is in its retracted position. Also, the shock absorbers 94 are arranged so that they become fully collapsed so as to in effect form a positive up-stop for the push bar 54 when the latter reaches its extended position.

It is herenoted that the push bar 54 may be deactivated by simply disconnecting the chains 68 from the discharge gate 34 and respectively reconnecting them to a pair of pins 96 fixed to the brackets 52. The reconnected chains 68 are tight and thus hold the push bar 54 in its retracted position.

The operation of the push bar assembly 50 is briefly as follows.

Assuming the baler 10 to contain a bale ready for discharge, the bale discharge gate 34 will be closed and the bale push bar 54 will be retracted. Discharge of the bale is then accomplished by effecting extension of the gate actuators 40 and opening of the gate 34. Initial movement of the gate 34 will result in the initially taut chains 68 going slack with no movement of the gate 34 being transferred to the push bar 54 until the gate has moved relative to the push bar a distance sufficient to retighten the chains 68. By this time the bale will have dropped on the ground ahead of the transverse push member 56 of the push bar. Further movement of the gate 34 toward its fully open position once the chains 68 tighten, causes the push bar 54 to begin to extend. Initial movement of the push bar 54 moves the tension springs 92 over center and they go from a condition biasing the push bar toward its retracted position to a condition biasing the push bar toward its extended position. The bale, because of its contact with the push member 56, will offer resistance to the action of the springs 92 and the push bar 54 will be extended only by action of the chains 68 as the gate 34 travels on to its fully open position. Should the gate 34 be opened when no bale is contained in the baler, the shock absorbers 94 act against the action of the springs 92 to slow the rate of movement of the push bar 54 that would otherwise occur. The push bar 54 is then holding, or at least positioned to hold, the discharged bale rearwardly of the path traced by the lowermost (when closed) portion of the gate 34 and the actuators 40 are then controlled to retract to return the gate 34 to its closed position. The tension springs 92 act to keep the push bar 54 extended until the gate 34 has moved sufficiently far to once again tighten the chains 68 to pull the push bar 54 back towards its retracted position. Just before the push bar 54 reaches its retracted position, the springs 92 will move over center and act to bias the push bar 54 to its retracted position. The shock absorbers 94 will also dampen this movement. During the opening and closing of the gate 34, the shock absorbers 76 will act to prevent the chains 68 from being shock loaded when the gate pulls the chains from their slack to their tight conditions. Also, the effective length of the flexible members defined by the shock absorbers 76 and chains 68 can be adjusted to vary the distance a bale is pushed by adjusting the preload on the compression springs by tightening or loosening the double nut assembly 84, with tightening of the nuts shortening the effective length and loosening of the nuts lengthening the effective length. The tension springs 88 act to keep the shock absorbers 76 properly oriented so that they do not foul the chains 68 when the latter are slack.

When the action of the push bar 54 is not desired, it may be deactivated by simply disconnecting the chains 68 from the gate 34 and reconnecting them to the pins 96 fixed to the brackets 52. The chains 68 then act to retain the push bar 54 in its retracted position whereby bales may be discharged without any interference thereby.

We claim:

1. In a baler for forming large cylindrical bales including a front section, a bale discharge gate defining a rear section and being vertically pivotally mounted to the front section for movement between a lowered closed position and a raised open position, an extensible and retractable actuator connected between the front and rear section for selectively opening and closing said gate, and a U-shaped bale push bar having opposite legs joined by a push member and being vertically pivotally mounted to opposite sides of the front section for movement about a horizontal axis between a retracted position disposing the push member beneath the gate when the latter is completely closed and an extended position disposing the push member rearwardly beyond the gate when the gate is in its open position and a further actuator for causing the movement of the push bar from its retracted to its extended position to follow movement of the gate to its open position and for causing movement of the push bar from its extended to its retracted position to follow movement of the gate to its closed position, the improvement comprising: said push member being located along a second axis paralleling said horizontal axis and including a cylindrical metal core having a plastic tube rotatably mounted thereon for rotation about said second axis for reducing frictional drag of said push bar with a bale.

* * * * *